April 8, 1930.   J. WHITMORE   1,753,490
DUST COLLECTOR OR SEPARATOR
Original Filed Jan. 15, 1926

FIG.1.ᵃ

FIG.3.ᵃ

Inventor—John Whitmore
Toulmin & Toulmin
attorneys

Patented Apr. 8, 1930

1,753,490

UNITED STATES PATENT OFFICE

JOHN WHITMORE, OF BELFAST, IRELAND, ASSIGNOR TO DAVIDSON & COMPANY, LIMITED, OF SIROCCO ENGINEERING WORKS, BELFAST, IRELAND

DUST COLLECTOR OR SEPARATOR

Original application filed January 15, 1926, Serial No. 81,369, and in Great Britain December 5, 1925. Divided and this application filed September 8, 1926. Serial No. 134,265.

This invention relates to dust collectors or separators and the like, and has for its object to provide improved means for reducing and overcoming the resistance set up by the whirling body of air within the separating chamber, more particularly of that kind of apparatus in which a tubular outlet, such as a chimney or the like, passes vertically through the separating chamber and the purified air escapes from the chamber into the said outlet through an opening provided in the side of the outlet.

According to my present invention I arrange a number of stationary guide vanes over the said opening in the wall of the outlet or chimney in such a manner that the whirling flow of the dust-laden air is converted without shock into a linear flow during the passage of the purified air over the surface of the vanes from the exterior to the interior of the chimney.

Various constructional forms according to the invention will now be described as examples with reference to the accompanying diagrammatic drawings, in which—

Figure 1:
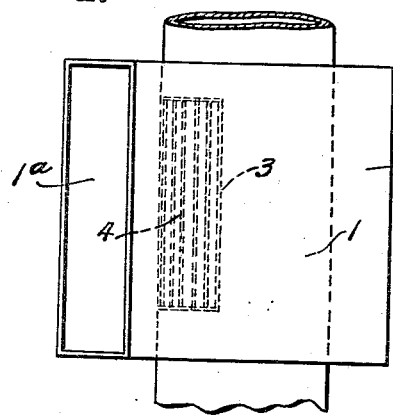

Fig. 1 shows one arrangement of the rectifying vanes according to the invention covering the opening in the wall of an outlet chimney.

Figure 1ª is a section taken along the line 1ª—1ª of Figure 1.

Figure 3:
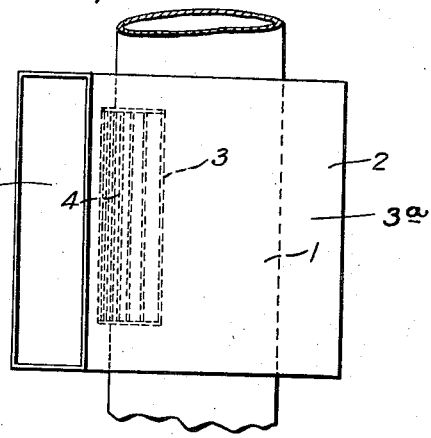
Figure 3:
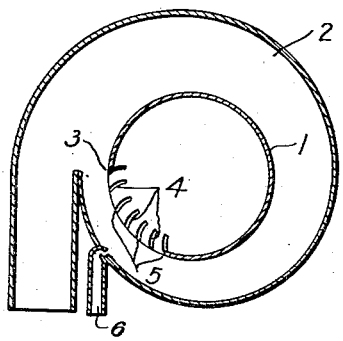
Figure 3:
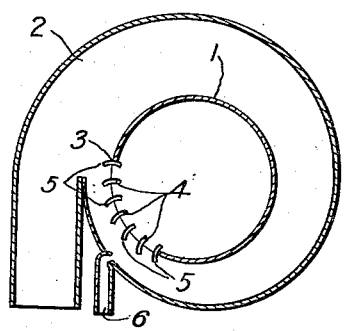
Figure 2:
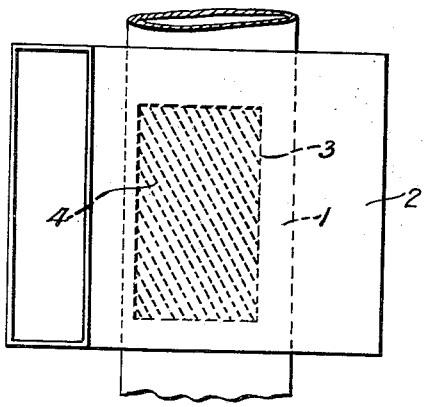
Figure 4:
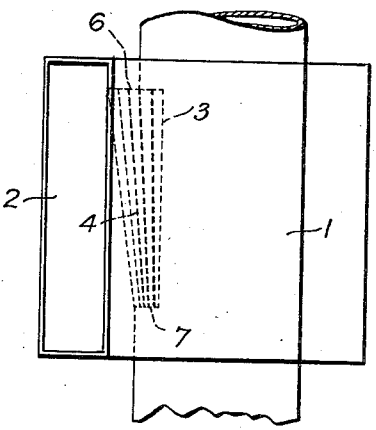

Figs. 2, 3 and 4 show alternative arrangements of the said rectifying vanes.

Figure 3ª is a section taken along the line 3ª—3ª of Figure 3.

Referring to the drawings generally, the apparatus diagrammatically represented consists of a vertically arranged chimney 1 of constant diameter or cross section which passes through the dust collector or separator casing 2, as illustrated and described in my co-pending application No. 81,369, of which the present application is a division.

The present invention is more particularly applicable to dust collecting apparatus of the kind illustrated in Figs. 4 and 9 of my copending application No. 710,106, and in which the purified air, after the dust and the like solid particles have been separated therefrom, passes through an opening 17 formed in the wall of that part of the chimney 3 passing through the casing 1, as indicated in the drawings of that application.

According to my present invention I arrange a number of stationary guide vanes 4 over an opening 3 (corresponding to the said opening 17 in my earlier application) in such a manner that the vanes convert the whirling body of air into a linear flow without shock as the said air passes over the surface of the vanes when escaping from the casing 2 into the chimney 1.

Fig. 1 of the drawings shows the guide vanes 4 arranged vertically over the opening 3 in the chimney 1. The vanes 4 are attached to the upper and lower edges of the opening 3 and the intake or leading edges 5 of the vanes are flush with the inside of the chimney and are curved in such a manner as to pick up the whirling body of air and change its direction from a vortical to a linear flow without shock while the said air is passing from the outside to the inside of the chimney 1, after which the air will pass up the chimney in the usual manner, all vortical motion having been thus destroyed and the resistance to the escape of the air reduced to a minimum.

Fig. 2 shows a modification of the arrangement shown in Fig. 1 in which the vanes 4, instead of being arranged vertically, are arranged diagonally, or at an angle to the vertical, and with their intake edges flush with the outside of the chimney.

Figs. 3 and 3ª show a further modification in which a set of vertical vanes 4 projects beyond the exterior of the chimney and into the collector casing 2.

Fig. 4 shows yet another modification in which the vanes 4 project at one end 6 away from the chimney into the interior of the casing 2, while the other end 7 is arranged flush, or approximately so, with either the interior or exterior of the chimney.

In all of the arrangements illustrated the whirling air, after the dust is separated therefrom, is forced gradually inwards by the continued influx of the dust laden current and by the volute or spiral formation of casing 2 when such construction is employed, and, on engaging the outer wall of the tubular outlet or chimney 1, is caused to flow over the surface of the vanes 4 and thus to change its direction of flow without shock from a vortical into a linear path as it passes from the casing 2 into the interior of the chimney 1, thus effecting a considerable reduction in the resistance to the escape of the said air from the apparatus due to the vortical motion originally imparted to the dust-laden current after entering the apparatus.

In the following claims the term "gas" is to be understood as including air, vapour, and fluid currents such as smoke consisting of a mixture of gas or vapour and solid particles. The dust collecting passageway is indicated at 6, the said passageway opening into the vortex chamber, and permitting the collection of dust therethrough. There is also provided a dust collecting lip adjacent the passageway, whereby dust will be thrown out from the air and collected through the passageway 6. The air will pass out through the opening 3 into the chimney 1 without shock, since the pressure in the chimney 1 is less than that in the vortex chamber. The air will accordingly take the path of least resistance and will pass out into the chamber without reversal of direction of flow.

What I claim and desire to secure by Letters Patent is:—

1. The combination, in a dust collector, of a vortex chamber, a chimney passing completely therethrough having a passageway in the side of the chimney communicating with the vortex chamber and vanes associated with said passageway whereby the whirling flow of gas in the vortex chamber is converted into linear flow in the chimney without shock in order to effect a reduction in the resistance within the apparatus.

2. The combination, in a dust collector, of a vortex chamber having a side wall, top and bottom walls, and tangential inlet passageway, a chimney passing through the top and bottom walls of the vortex chamber without communicating with the interior of the vortex chamber said chimney having an opening in the side of the chimney located adjacent to the inlet passageway at a point where the gases in the vortex chamber complete the revolution therein and vanes in said opening for facilitating the removal of gases at the end of their revolution and delivering them into the chimney.

3. The combination, in a dust collector, of a vortex chamber having a side wall, top and bottom walls, and a tangential inlet passageway, a chimney passing through the top and bottom walls of the vortex chamber without communicating with the interior of the vortex chamber said chimney having an opening in the side of the chimney located adjacent to the inlet passageway at a point where the gases in the vortex chamber complete the revolution therein and vanes in said opening for facilitating the removal of gases at the end of their revolution and delivering them into the chimney, said chimney being located in said vortex chamber closer to the wall of the chamber adjacent the vortex chamber inlet passageway opening than in any other place in the chamber.

4. The combination, in a dust collector, of a vortex chamber, a chimney passing completely therethrough having a passageway in the side of the chimney communicating with the vortex chamber and vanes associated with said opening, whereby the whirling flow of gas in the vortex chamber is converted into linear flow in the chimney without shock in order to effect a reduction in the resistance within the apparatus and means to collect the dust thrown out in the vortex chamber.

5. The combination, in a dust collector, of a vortex chamber having a side wall, top and bottom walls, and tangential inlet passageway, a chimney passing through the top and bottom walls of the vortex chamber without communicating with the interior of the vortex chamber said chimney having an opening in the side of the chimney located adjacent to the inlet passageway at a point where the gases in the vortex chamber complete the revolution therein and vanes in said opening for facilitating the removal of gases at the end of their first revolution and delivering them into the chimney, and means to collect the dust thrown out in the vortex chamber.

6. The combination, in a dust collector, of a vortex chamber having a side wall, top and bottom walls, and a tangential inlet passageway, a chimney passing through the top and bottom walls of the vortex chamber without communicating with the interior of the vortex chamber said chimney having an opening in the side of the chimney located adjacent to the inlet passageway at a point where the gases in the vortex chamber complete a revolution therein, vanes in said opening for facilitating the removal of gases at the end of their revolution and delivering them into the chimney, said chimney being located in said vortex chamber closer to the wall of the chamber adjacent the vortex chamber inlet opening than in any other place in the chamber, and means to collect the dust thrown out in the vortex chamber.

7. The combination, in a dust collector, a vortex chamber, a chimney passing therethrough having an opening in the side thereof communicating with said chamber, said chimney being located nearer to the wall at the end of the vortex movement than at any other point in the vortex chamber, vanes associated with the opening into the chimney for collecting the vortex air and delivering it into the chimney, and a dust-collecting passageway having a collecting lip projected through the wall of said vortex chamber adjacent the opening in the chimney whereby the dust thrown out against the wall of the vortex chamber will be collected and the air will pass into the chimney without shock.

8. The combination, in a dust collector, of a casing comprising a vortex chamber, a chimney passing completely therethrough having an opening in the side thereof communicating with the vortex chamber and vanes attached to the chimney in said opening, one part of which vanes project away from the wall of the chimney into the casing and another part being approximately flush with the chimney wall, whereby the whirling flow of the gas is converted into a linear flow in the chimney without shock during the passage of the gas over the surface of the vanes.

9. The combination in a dust collector of a volute vortex chamber, a chimney passing therethrough, said chimney having an opening in the side thereof communicating with the interior of the vortex chamber and the interior of the chimney, said opening being placed in the portion of the chimney nearest to the side wall of the said volute vortex chamber.

10. The combination in a dust collector of a volute vortex chamber, a chimney passing therethrough, said chimney having an opening communicating with the interior of the vortex chamber, and in that portion of the chimney nearest to the side wall of the vortex chamber, and vanes associated with said opening for collecting the gases in the vortex chamber at the end of the revolution of the gases therein, and directing said gases into said chimney at right angles to the vortex flow without shock, whereby the minimum of resistance is experienced in the operation of the apparatus.

11. The combination in a dust collector of a volute vortex chamber, a chimney passing therethrough, said chimney having an opening communicating with the interior of the vortex chamber and in the portion of the chimney nearest to the side wall of the vortex chamber, and means to collect the dust thrown out in the vortex chamber.

12. The combination in a dust collector of a vortex chamber, a chimney passing therethrough, said chimney having an opening communicating with the interior of the vortex chamber, and in the portion of the chimney nearest to the side wall of the vortex chamber, and vanes associated with said opening for collecting the gases in the vortex chamber at the end of the revolution of the gases therein, and directing said gases into said chimney at right angles to the vortex flow without shock, whereby the minimum of resistance is experienced in the operation of the apparatus and means to collect the dust thrown out in the vortex chamber.

In testimony whereof I affix my signature.

JOHN WHITMORE.